(12) United States Patent
Elliott et al.

(10) Patent No.: US 7,242,774 B1
(45) Date of Patent: Jul. 10, 2007

(54) QUANTUM CRYPTOGRAPHY BASED ON PHASE ENTANGLED PHOTONS

(75) Inventors: Brig Barnum Elliott, Arlington, MA (US); John D. Schlafer, Wayland, MA (US); David Spencer Pearson, Bennington, VT (US)

(73) Assignee: BBN Technologies Corp., Cambridge, MA (US)

( * ) Notice: Subject to any disclaimer, the term of this patent is extended or adjusted under 35 U.S.C. 154(b) by 729 days.

(21) Appl. No.: 10/462,400

(22) Filed: Jun. 16, 2003

Related U.S. Application Data (60) Provisional application No. 60/456,871, filed on Mar. 21, 2003.

(51) Int. Cl.
*H04L 9/00* (2006.01)
(52) U.S. Cl. ............................ 380/256; 356/73.1
(58) Field of Classification Search ............... 380/256; 356/73.1
See application file for complete search history.

(56) References Cited

U.S. PATENT DOCUMENTS

| | | | |
|---|---|---|---|
| 5,243,649 A | 9/1993 | Franson | 380/9 |
| 6,605,822 B1 * | 8/2003 | Blais et al. | 257/34 |
| 6,646,727 B2 * | 11/2003 | Saleh et al. | 356/73.1 |
| 6,728,281 B1 * | 4/2004 | Santori et al. | 372/45.01 |
| 6,882,431 B2 * | 4/2005 | Teich et al. | 356/497 |
| 6,897,434 B1 * | 5/2005 | Kumar et al. | 250/227.18 |
| 7,035,411 B2 * | 4/2006 | Azuma et al. | 380/256 |
| 2002/0097874 A1 * | 7/2002 | Foden et al. | 380/256 |

OTHER PUBLICATIONS

A. Imamoglu and Y. Yamamoto, "Turnstile Device for Heralded Single Photons: Coulomb Blockade of Electron and Hole Tunneling in Quantum Confined p-l-n Heterojunctions", Physical Review Letters, vol. 72, No. 2, Jan. 10, 1994, pp. 210-213.*
J.D. Franson: "Bell Inequality for Position and Time," Physical Review Letters, vol. 62, No. 19, Laurel, Maryland, May 8, 1989, pp. 2205-2208.
Grégoire Ribordy et al.: "Long-distance entanglement-based quantum key distribution," Physical Review A. vol. 63, 012309, Geneva, Switzerland, Dec. 13, 2000, pp. 012309-1 through 012309-12.
N. Gisin et al.: "Quantum cryptography and long distance Bell experiments: How to control decoherence," Geneva, Switzerland, Jan. 15, 1999, pp. 1-7 and 4 pages and drawings.
Artur K. Ekert: "Quantum Cryptography Based on Bell's Theorem," Physical Review Letters, vol. 67, No. 6, Aug. 5, 1991, Oxford, U.K., pp. 661-663.

(Continued)

*Primary Examiner*—Taghi T. Arani
(74) *Attorney, Agent, or Firm*—Fish & Neave IP Group Ropes & Gray LLP (57) ABSTRACT

A quantum cryptography system [100] may include a transmitter [110] configured to generate entangled first and second photons, modulate and detect the first photon, and transmit detection information and the second photon. The system [100] may also include a receiver [160] configured to modulate the second photon. The receiver [160] may also be configured to detect the second photon based on the detection information.

13 Claims, 7 Drawing Sheets

OTHER PUBLICATIONS

D.S. Naik et al.: "Entangled State Quantum Cryptography: Eavesdropping on the Ekert Protocol," Physical Review Letters, vol. 84, No. 20, May 15, 2000, Queensland, Australia, pp. 4733-4736.

Thomas Jennewein et al.: "Quantum Cryptography with Entangled Photons," Physical Review Letters, vol. 84, No. 20, May 15, 2000, Vienna, Austria, pp. 4729-4732.

Nicolas Gisin et al.: "Quantum Cryptography," Reviews of Modern Physics, vol. 74, Jan. 2002, Geneva, Switzerland, pp. 145-184.

W. Tittel et al.: "Long-distance Bell-type tests using energy-time entangled photons," Physical Review A, vol. 59, No. 6, Jun. 1999, Geneva, Switzerland, pp. 4150-4163.

S. Tanzilli et al.: "PPLN waveguide for quantum communication," The European Physical Journal D, Jul. 13, 2001, pp. 155-160.

* cited by examiner

QUANTUM CRYPTOGRAPHY BASED ON PHASE ENTANGLED PHOTONS

RELATED APPLICATION

This application claims the benefit of priority under 35 U.S.C. § 119(e) of a provisional application Ser. No. 60/456,871, filed Mar. 21, 2003, the entire contents of which are incorporated herein by reference.

GOVERNMENT INTEREST

The invention described herein was made with government support. The U.S. Government may have certain rights in the invention, as provided by the terms of contract No. F30602-01-C-0170 awarded by the Defense Advanced Research Projects Agency (DARPA).

BACKGROUND OF THE INVENTION

1. Field of the Invention

The present invention relates generally to cryptography and, more particularly, to quantum cryptography systems and methods.

2. Description of the Related Art

The worldwide proliferation of digital communication fuels an ongoing quest for more secure and efficient modes of conveying information. In the context of the Internet, for example, digital exchanges between geographically separated parties may pass through any number of non-secure intermediate devices and thus invite a wide variety of unwanted third party interference, including eavesdropping, tampering and impersonation. Such interference in turn drives development and use of an equally wide variety of preventative measures.

The art of cryptography represents one such measure. In cryptography-based systems, a sending party encrypts a message to produce a corresponding cipher message, or cryptogram, and transmits the cipher message to an intended recipient via a potentially non-secure communication channel. The intended recipient then decrypts the cipher message to recover the original message. Since the cipher message is, at least in theory, unintelligible to anyone other than the sender and the intended recipient, a potentially malicious third party with access to the communication channel cannot readily eavesdrop or otherwise interfere.

Quantum cryptography (i.e., cryptography using applied quantum mechanics) is one type of cryptography that has certain advantages. In single-photon quantum cryptography, for example, cipher symbols (also known as "values") may be encoded via non-commuting observables of individual photons conveyed from a sender to an intended recipient (e.g., via an optical fiber). Because quantum mechanics guarantees that a third party cannot divide a single photon, or simultaneously discern precise values for non-commuting observables of a single photon, the sender and the intended recipient may work together to develop secure and mutually agreed upon ciphers for use in subsequent cryptographic exchanges.

Quantum cryptography based on highly attenuated laser sources ("Weak Coherent" quantum cryptography) may be vulnerable to advanced forms of eavesdropping. In particular, one attack may be termed a Photon Number Splitting (PNS) attack. This attack exploits the fact that attenuated sources are not true single-photon sources, but rather produce photons by a Poissonian process. Thus sometimes multiple photons may be emitted instead of a single photon. The attack determines which emitted pulses in fact contain multiple photons. It suppresses all other pulses, extracts one or more photons from the multi-photon pulses and then analyzes them, and then delivers the remaining photon (or its synthesized surrogates) to the intended receiver. In this manner, the eavesdropper can reliably learn the contents of the supposedly secure transmission of raw key material, and hence may be able to intercept, read, and fabricate messages. Several other such attacks have been proposed in the specialist literature, based on the emission characteristics of attenuated Weak Coherent laser sources.

To remedy these shortcomings, some research teams have proposed and occasionally built forms of quantum cryptographic systems based on the production and detection of pairs of entangled photons, such as the process of Spontaneous Parametric Downconversion. Such systems appear to overcome some weaknesses of Weak Coherent systems. However, existing systems based on entanglement do not provide any means for performing Path Length Control which is the process of continually readjusting two widely separated interferometers (one at the transmitter and the other at the receiver) to maintain an exact relationship between their lengths, even as temperatures of the interferometers rise and fall, etc. Nor do they provide any facility for generating numbered frames of entangled photons rather than a single, long, unnumbered series of such photons. In addition these systems lack convenient facilities for debugging and trouble-shooting. Consequently, a need exists for improved forms of quantum cryptography based on entanglement of photons.

SUMMARY OF THE INVENTION

Systems and methods consistent with the present invention address this and other needs by locally generating a series of entangled photon pairs, detecting one photon of an entangled pair and remotely detecting another photon of the entangled photon pair based on the local detection of the one photon.

In accordance with the purpose of the invention as embodied and broadly described herein, a quantum cryptography system may include a transmitter configured to generate entangled first and second photons, modulate and detect the first photon, and transmit detection information and the second photon. The system may also include a receiver configured to modulate the second photon. The receiver may also be configured to detect the second photon based on the detection information.

In another implementation consistent with the present invention, a transmitter in a quantum cryptography system may include an optical apparatus configured to produce first and second entangled photons and a modulator configured to receive and modulate the first photon. Two detectors may be coupled to an output of the modulator and may be configured to detect the first photon from the modulator. Logic may be coupled to the modulator and the two detectors.

In a further implementation consistent with the present invention, a receiver within a quantum cryptography system may include a herald detector configured to receive a herald signal from a communication channel and generate a detection signal. A modulator may be configured to receive an entangled photon from the communication channel and phase modulate the entangled photon. Two detectors may be coupled to the modulator and configured to detect the entangled photon. Logic may be coupled to the herald detector, the modulator, and the two detectors.

In yet another implementation consistent with the present invention, a method may include generating first and second entangled photons and locally detecting the first entangled photon. The method may also include transmitting a herald signal based on detection of the first entangled photon and transmitting the second entangled photon. The method may also include preparing to receive the second entangled photon based on the herald signal and detecting the second entangled photon if the second entangled photon arrives during a detection window.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Rather, the scope of the invention is defined by the appended claims and equivalents.

Methods and systems consistent with the principles of the invention may locally detect one photon of an entangled photon pair. Another photon of the entangled photon pair may be remotely detected based on the local detection of the one photon.

Exemplary System

Figure 1:
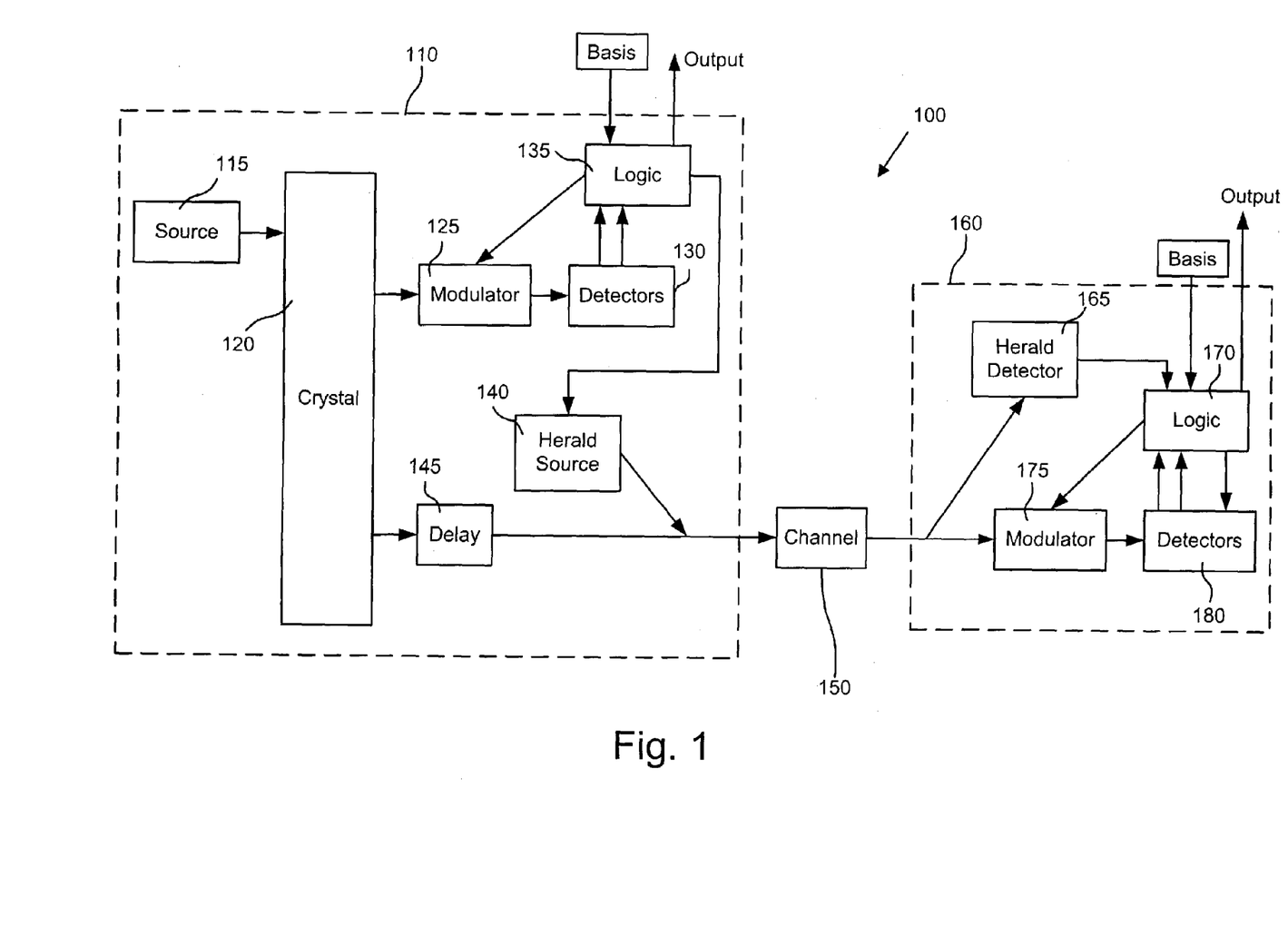
FIG. 1 illustrates an exemplary cryptography system in an implementation consistent with the principles of the invention.

FIG. 1 illustrates an exemplary cryptography system 100 in which the principles of the present invention may be implemented. System 100 may include a transmitter 110 and a receiver 160 connected by a communication channel 150. In the cryptographic arts, transmitter 110 may be referred to as an encoder, "Alice," and receiver 160 may be referred to as a decoder, "Bob." Similarly, an eavesdropper monitoring channel 150 may be referred to as "Eve." Although receiver 160 also may communicate with transmitter 110 (e.g., in accordance with a quantum communication protocol such as BB84) as will be understood by those skilled in the art, the description herein will primarily focus on transmission of information from transmitter 110 to receiver 160.

Transmitter 110 may include a source 115, a crystal 120, a modulator 125, detectors 130, logic 135, a herald source 140, and a delay element 145. Logic 135 may receive an externally-supplied basis and may supply an output to, for example, a processor (not shown) external to transmitter 110. As an initial overview, source 115 and crystal 120 may function to produce pairs of quantum-entangled photons. Modulator 125 and detectors 130 may operate on and locally detect one photon of a given entangled pair of photons. Upon such detection, logic 135 may cause herald source 140 to send an annunciator signal (or "herald" signal) to receiver 160 over channel 150. Delay element 145 may receive and delay the second photon of the given entangled pair so that it travels to receiver 160 over channel 150 after the herald signal.

Figure 2:
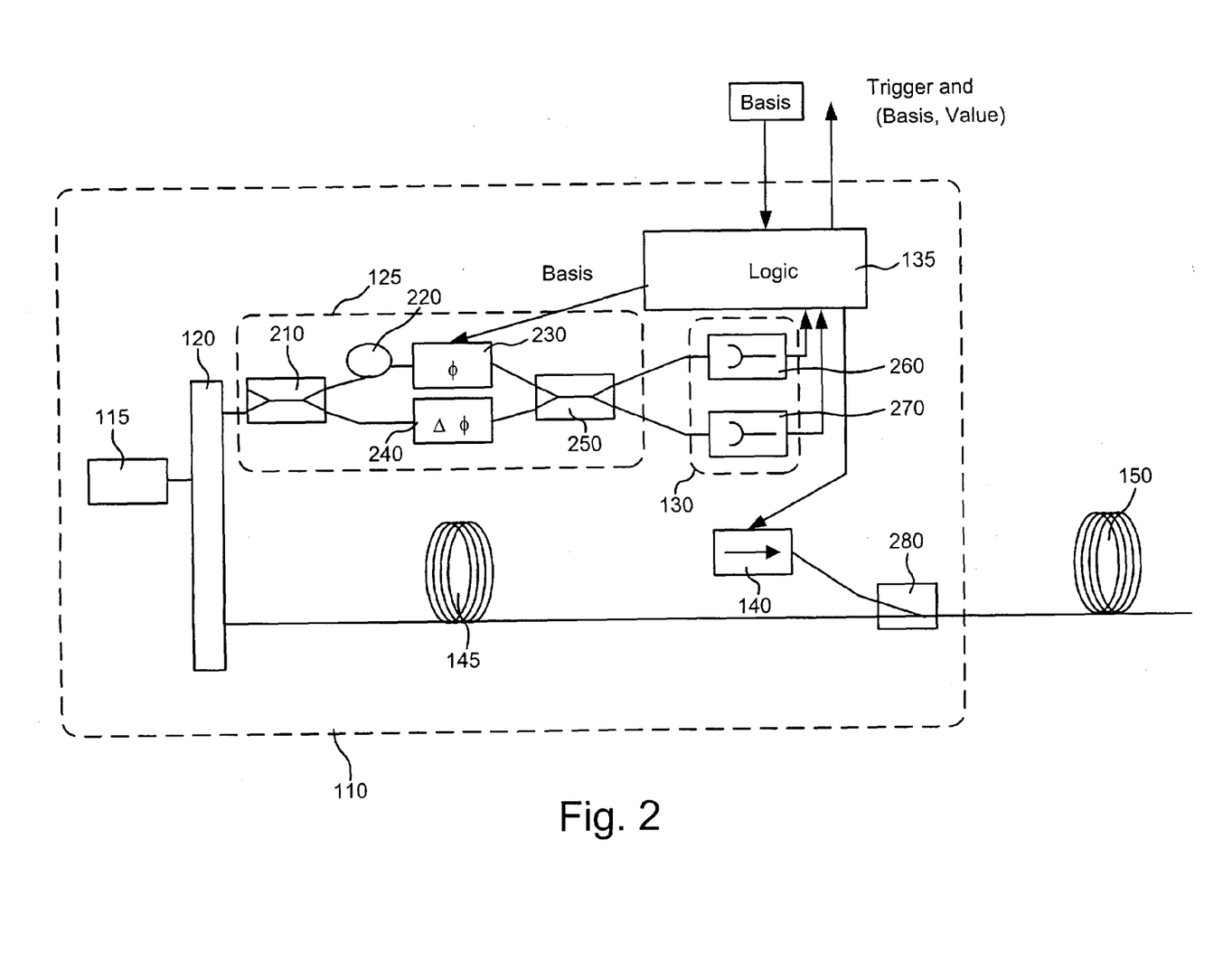
FIG. 2 illustrates one implementation of the transmitter of FIG. 1.

FIG. 2 illustrates one implementation of transmitter 110 and channel 150. Source 115 may be a continuous wave (CW) laser source configured to provide a steady stimulus of pump photons to crystal 120. In one implementation consistent with the principles of the invention, the coherence length of these pump photons ($l_p$) is on the order of about 60 meters.

Crystal 120 may be configured to be stimulated by pump photons from source 115. Energy levels may be raised within crystal 120 by these pump photons, and after some unpredictable time, the energy level of atoms within crystal 120 will fall, emitting one or more "down-conversion" photons. Some fraction of these photons are caused by a particular physical process (i.e., Spontaneous Parametric Down-Conversion (SPDC)) that produces pairs of quantum-entangled photons. In one implementation consistent with the principles of the invention, the coherence length of these entangled photons ($l_c$) is on the order of about 1 μm.

In one implementation consistent with the principles of the invention, crystal 120 may produce entangled pairs of photons at respective wavelengths of about 810 nm and 1550 nm, although other wavelengths are possible. Crystal 120 may include two different photonic paths: one for the 810 nm photons leading to modulator 125 and another for the 1550 nm photons leading to delay element 145. For each pair of entangled photons emitted by crystal 120, one photon may enter modulator 125, and the other photon may enter delay element 145.

In one implementation consistent with the principles of the invention, modulator 125 may include an interferometer, such as a Mach-Zehnder interferometer. In such an implementation, modulator 125 may include a coupler 210, a delay loop 220, a phase shifter 230, a phase adjustor 240, and a coupler 250. Couplers 210 and 250 may respectively split and recombine an input optical signal between a "long arm" (i.e., delay loop 220 and phase shifter 230) and a "short arm" (i.e., phase adjustor 240) of modulator 125. The designator "long" in the long arm of modulator 125 refers to the added path length/time introduced by delay loop 220, relative to the short arm that includes phase adjustor 240. In one implementation consistent with the principles of the invention, the path length difference between the long and short arms (Δl) is on the order of about 1 meter.

As will be understood by those skilled in the art, couplers 210 and 250 may be 50/50 couplers. Hence, coupler 250, for example, may at random send an incoming single photon to one of the detectors 130 (e.g. detector 260), or may at random send the photon to the other one of detectors 130 (e.g. detector 270).

Phase shifter 230 may be configured to introduce a phase shift/delay to the optical signal in the long arm of modulator 125 based on a "basis" signal that it received from logic 135. As used herein, a "basis" signal/value may denote a random variable used in accordance with a quantum encryption protocol, such as BB84. For example, depending on the basis signal, phase shifter 230 may introduce a phase shift of 0°, 45', 90', 135', etc. to an optical signal (i.e., one photon of an entangled pair) passing therethrough. Phase adjustor 240 may be configured to introduce a fixed phase shift/delay to optical signals passing through the short arm of modulator 125. Phase adjustor 240 may be used to adjust the path length difference $\Delta l$ of modulator 125, for example, to adjust for component drift or to correspond to the path difference of a similar modulator in receiver 160.

Detectors 130, in one implementation consistent with the principles of the invention, may include a first detector (D0) 260 and a second detector (D1) 270. First detector 260 may be coupled to one output of coupler 250, and a second detector 270 may be coupled to another output of coupler 250. First and second detectors 260/270 may include silicon avalanche photodiodes (Si APDs), which may be configured to trigger/fire upon receiving a single photon from modulator 125.

Logic 135 may be configured to receive a photon detection signal from one of first and second detectors 260/270 and to trigger herald source 140 in response. Logic 135 may also be configured to receive an externally-supplied basis and to supply that basis to phase shifter 230. Logic 135 may also output the basis and which of first and second detectors 260/270 fired first. Logic 135 also may, in some implementations, output information relating to the trigger signal sent to herald source 140.

Herald source 140 may include, for example, a diode laser. This source 140 may also be referred to as a "bright" source, because it may output a relatively bright (e.g., multiple photons, high power) signal, compared to a single photon. Herald source may output a herald signal (or an "annunciator" signal, or "out of band bits," or more generally, "information") with a wavelength of about 1300 nm, in one implementation consistent with the principles of the invention. The herald signal from herald source 140 may be transmitted along channel 150 via combiner 280, which serves to combine signals from herald source 140 and delay element 145.

In some implementations consistent with the principles of the invention, the herald signal from source 140 may include other information, such as framing information or training information. The herald signal may also include control information, such as frame markers, sequence numbers, IP addresses, and/or training information. One such implementation is described in commonly-assigned application Ser. No. 10/462,292, filed Jun. 16, 2003, entitled "Automatic Control of Quantum Key Distribution" which is incorporated by reference herein in its entirety. During actual transmission of, for example, an encryption key, such additional information may be absent or modified to avoid disclosing the information to an eavesdropper.

Delay element 145 may include, for example, a length of polarization maintaining optical fiber. The length of such fiber should be sufficient to delay the a photon at 1550 nm emitted by crystal 120 for a sufficient time for herald source 140 to send a herald signal down channel 150.

Channel 150 may include a length (e.g., 5–10 km) of single mode optical fiber. In one implementation consistent with the principles of the invention, channel 150 includes fiber typically employed for typical telecommunications networks.

Returning to FIG. 1, receiver 160 may include a herald detector 165, logic 170, a modulator 175, and detectors 180. Logic 170 may receive an externally-supplied basis and may supply an output to, for example, a processor (not shown) external to receiver 160. As an initial overview, herald detector 165 may detect a herald signal from channel 150 that precedes a photon. Based on this detection, logic 170 may "gate" detectors 180 in preparation for the arriving photon. Modulator 175 and detectors 180 may operate on and detect arriving photons.

Figure 3:
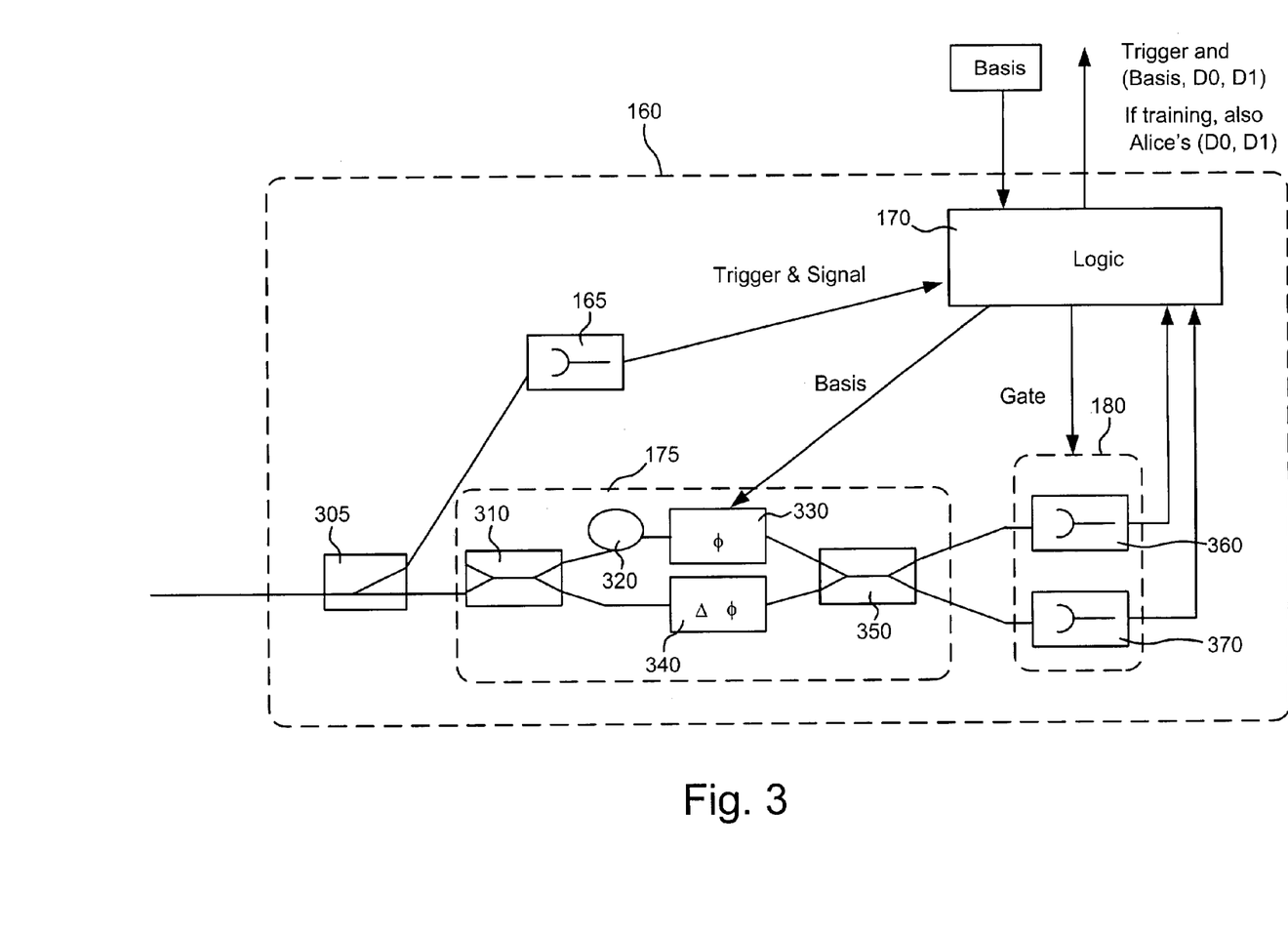
FIG. 3 illustrates one implementation of the receiver of FIG. 1.

FIG. 3 illustrates one implementation of receiver 160. In addition to the above-listed elements, receiver 160 may include a splitter 305 to separate the herald signal from the following entangled photon. In one implementation consistent with the principles of the invention, splitter 305 may be a wavelength division multiplexer (WDM) that separates the herald signal (e.g., at 1300 nm) from the entangled photon (e.g., at 1550 nm) based on their respective wavelengths. Other implementations, such as optical switches, are possible for splitter 305.

Herald detector 165 may be configured to detect the herald signal from herald source 140. In one implementation, herald detector may include a typical InGaAs photodiode designed for general telecommunications use such as a PIN detector. Herald detector 165 may output a trigger signal, and any other information in the herald signal, to logic 170 for further processing.

Logic 170 may be configured to receive a trigger signal from herald detector 165 and may also be configured to gate (i.e., bias in preparation of the arrival of an entangled photon) detectors 180 in response. Logic 170 may also be configured to receive an externally-supplied basis and to supply that basis to modulator 175. Logic 170 may also output the basis and the outputs of detectors 180. Logic 170 also may, in some implementations, output other information (e.g., training data) received from herald detector 165.

Modulator 175 may include an interferometer, such as a Mach-Zehnder interferometer. In such an implementation, modulator 175 may include a coupler 310, a delay loop 320, a phase shifter 330, a phase adjustor 340, and a coupler 350. Modulator 175 may be arranged and function like its counterpart modulator 125 in transmitter 110. Similarly, elements 310–360 may function the same as elements 210–260 of modulator, and thus elements 310–360 will not be separately described. Modulator 175 may also have a long arm (including delay loop 320) and a short arm (including phase adjustor 340), and the path length difference between the long and short arms ($\Delta l$) is on the order of about 1 meter.

Phase shifter 330 may be configured to introduce a phase shift/delay to the optical signal in the long arm of modulator 175 based on a basis signal that it received from logic 170. For example, depending on the basis signal, phase shifter 330 may introduce a phase shift of 0°, 45°, 90 °, 135°, etc. to an optical signal (i.e., one photon of an entangled pair) passing therethrough. In accordance with the BB84 cryptography protocol, for example, the basis supplied from logic 170 in receiver 160 may be random and independent from the basis used in transmitter 110.

Detectors 180, in one implementation consistent with the principles of the invention, may include a first detector (D0) 360 and a second detector (D1) 370. First detector 360 may be coupled to one output of coupler 350, and a second detector 370 may be coupled to another output of coupler 350. First and second detectors 360/370 may include InGaAs avalanche photodiodes (APDs) that have been thermo-electrically cooled to lower their dark current (i.e. detector noise). These detectors 360/370 may also be gated by logic 170 (i.e., a bias voltage is applied for a very short window around the expected arrival time of the entangled photon at 1550 nm). Such gating of detectors 360/370 may further increase detector sensitivity and reduce noise. The bias voltage (i.e., gating) may be triggered by detection of the herald signal by the herald detector 165-(PIN detector).

First and second detectors 360/370 may detect photons at a wavelength of 1550 nm, and may be operated in "Geiger gated" mode. In such a mode, the applied bias voltage exceeds the breakdown voltage for a very short period of time (i.e., a "gating period") when a photon is expected to arrive. Hence, an absorbed photon may trigger an electron avalanche consisting of thousands of carriers. Because the typical time for gating is normally a few nanoseconds, this Geiger mode of operation requires some knowledge of the second, entangled photon's arrival time. This arrival time may be deduced by logic 170 from herald detector 165, which may generate a trigger signal. Logic 170 may gate detectors 360/370 after a known delay upon receiving this trigger signal.

Exemplary Photon Detection Scheme

System 100 described above may employ modulators 125 and 170 that are reminiscent of a so-called "Weak-Coherent" quantum encryption system. System 100, however, operates according to different physical principles. A typical Weak-Coherent quantum encryption system (not shown) may convey '0' and '1' values by causing a single photon to interfere with itself in, for example, a coupler within an interferometer. System 100, by contrast, conveys '0' and '1' values by "coincidences" in the detection clicks of detectors 160/170 in transmitter 110 and detectors 260/270 in receiver 160. As used herein, a "coincidence" between a pair of quantum entangled photons may be conceptualized as a commonality in behavior of this pair of photons at different locations (i.e., in transmitter 110 and in receiver 160). This coincidence-based detection scheme may be further explained with respect to FIGS. 4–6.

Figure 4:
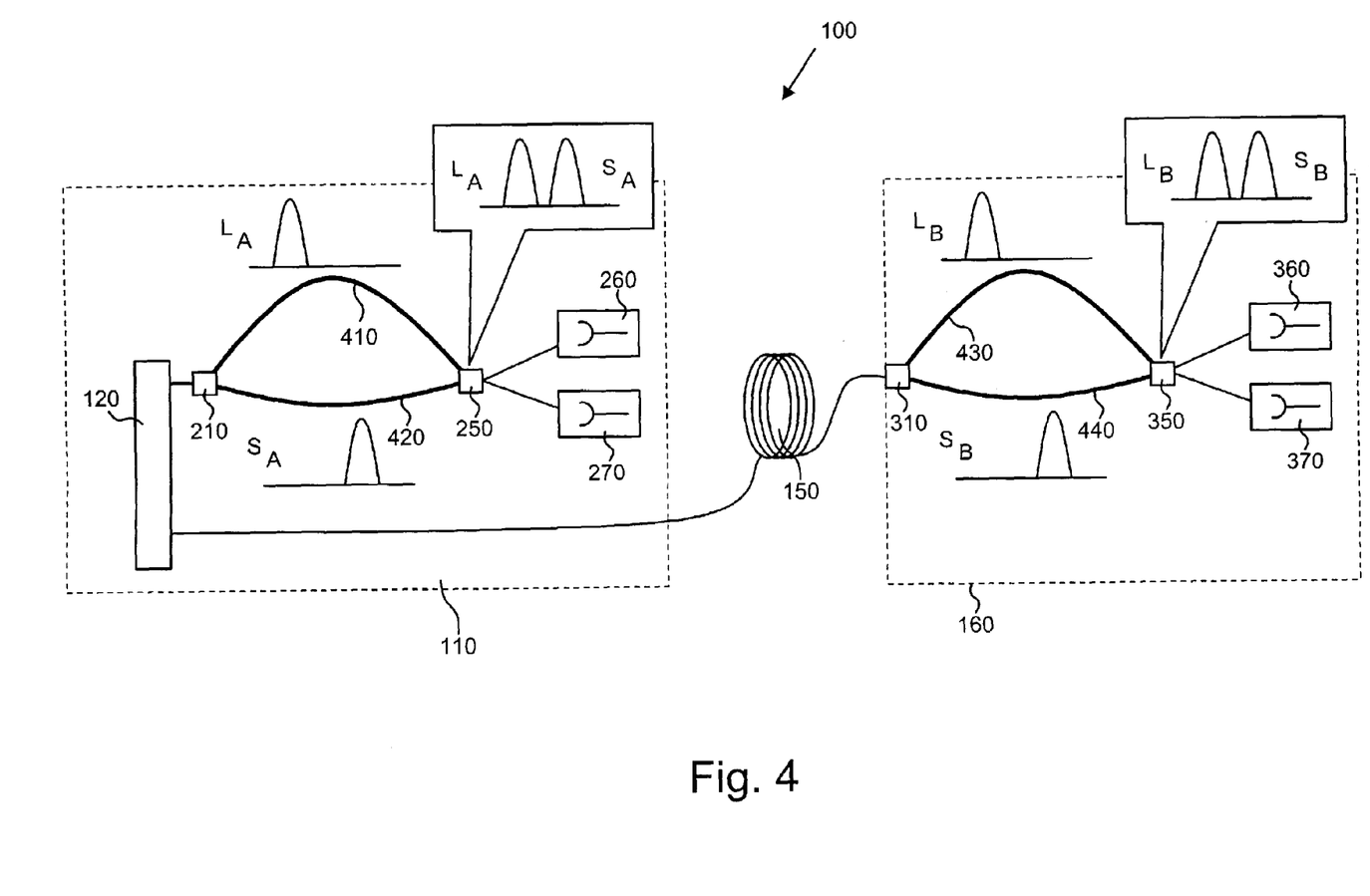
FIG. 4 is a schematic representation of the cryptography system 100 of FIGS. 1–3. in an implementation consistent with the principles of the invention.

FIG. 4 is a schematic representation of system 100 as illustrated in FIGS. 1–3. Elements not necessary to understanding of the operation of modulators 125 and 170 have not been shown. Further, elements that have been previously described will not be discussed in detail again. Modulator 125 in transmitter 100 may include long arm 410 and short arm 420, and modulator 175 in receiver 160 may include long arm 430 and short arm 440.

FIG. 4 illustrates a single photon (from an entangled pair) that does not interfere with itself, unlike in a typical Weak-Coherent system. There is no self-interference in system 100, because the imbalance in the short and long arm lengths ($\Delta l$) is greater than the photon's coherence length ($l_c$). The photon may be conceptualized as a wave rather than as a particle. Thus, the photon follows both paths (e.g., 410 and 420) of each modulator 125/175, rather than choosing a single path. The part of the photon pulse that follows the shorter leg (i.e., 420 or 440) of modulator 125/175 will emerge somewhat sooner than that part of the pulse that takes the longer leg (e.g., 410 or 430). Because the coherence length $l_c$ of a given photon is shorter than the difference in arm lengths $\Delta l$, the two partial pulses do not overlap at the coupler 250/350. Thus, unlike the operation of a typical Weak-Coherent system, the entangled photons in system 100 do not constructively or destructively interfere with themselves.

By their nature, entangled photons are in an indeterminate quantum state until interaction with a detector, such as one of detectors 260/270. Due to the interaction of a photon with a detector, the time at which the photon was generated may be fixed, but which path (e.g., long arm 410 or short arm 420) the photon took (and hence its phase) is still indeterminate. As will be understood, a coupler (e.g., coupler 250) may send a photon to one of detectors 260 and 270 based on the phase of the photon. As a result, photons that pass through modulators 125/175 will choose a detector (e.g., one or detectors 260/270 or one of detectors 360/370) at random. Photons will tend to trigger either detector with equal probability. Thus, for every entangled pair at transmitter, either detector 260 (D0) or detector 270 (D1) will fire unpredictably. This physically unpredictable event gives rise to the random "value" used in the quantum encryption protocol of system 100.

The same phenomenon also occurs at receiver 160. Thus, receiver 160 will also receive a random pattern of D0 and D1 clicks (i.e., hits on detectors 360 and 370). One might think that these random events would be completely uncorrelated with the corresponding events at transmitter 110, but this is not true. Approximately half of the time, the detections of entangled photons at transmitter 110 and receiver 160 will be uncorrelated, and the rest of the time, they will be completely correlated (i.e., "coincidences"). By precisely gating detectors 360 and 370, which events are correlated may be readily determined. In such cases, one may infer that a D0 click at receiver 160 means that D0 detector 260 of transmitter 110 also clicked, and a D1 click of receiver 160 means that D1 detector 270 of transmitter 110 also clicked. Such coincidence events between entangled photons facilitate the Entangled Link cryptography employed by system 100.

To exploit these coincidences, system 100 may employ a "Franson interferometer," which consists of two unbalanced Mach-Zehnder interferometers (e.g., modulators 125 and 170), each having a pair of detectors (e.g., 260/270 and 360/370), as described above. When arranged as described herein, these interferometers produce coincidences that may be exploited.

Figure 5:
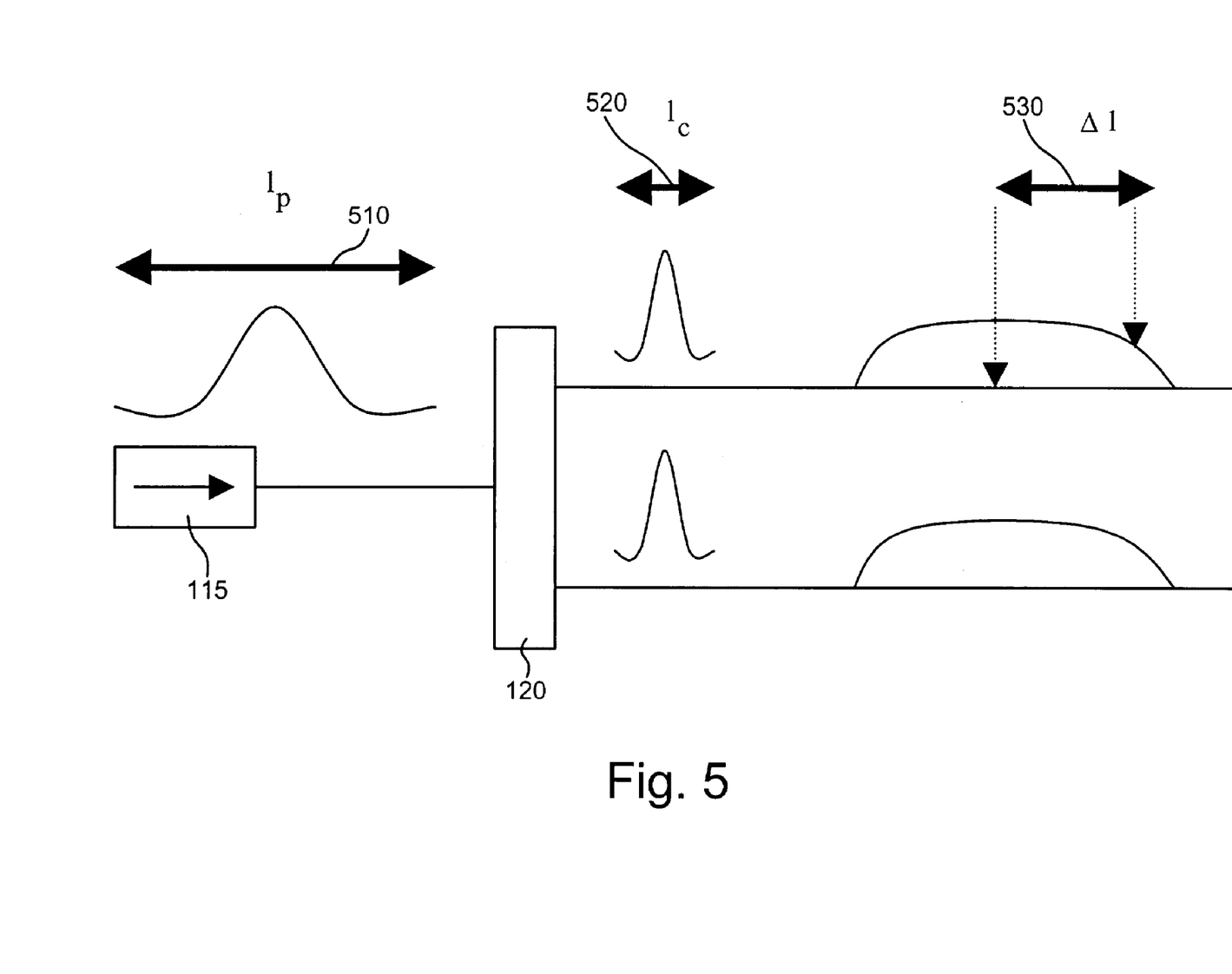
FIG. 5 schematically illustrates conditions for obtaining coincidences in a cryptography system.

FIG. 5 schematically illustrates conditions for obtaining coincidences in system 100. Three parameters should be properly related in order to generate coincidences in a Franson interferometer. These three parameters have been previously mentioned and are as follows: $l_p$—the coherence length 510 of the pump photons output by source 115; $l_c$—the coherence length 520 of down-converted, entangled photons output by crystal 120; and $\Delta l$—the path length difference 530 between long and short arms of modulators 125 and 170. Coincidences between the pair of entangled photons in modulators 125 and 170 may be obtained when: $l_c < \Delta l < l_p$.

In practice, the most difficult parameter to achieve is a sufficiently long coherence length $l_p$ 510 for the pump photons. Choosing a CW source as source 115 may aid in achieving such a long coherence length. As described above with respect to FIGS. 1–3, an entangled photon coherence length $l_c$ 520 of about 1 μm, a path length difference $\Delta l$ 530 of about 1m, and a pump photon coherence length $l_p$ 510 of about 60 m may satisfy the above inequality condition for a Franson interferometer. As those skilled in the art will understand, other values for $l_c$, $\Delta l$, and $l_p$ may be chosen as long as the $l_c < \Delta l < l_p$ inequality is met.

Figure 6:
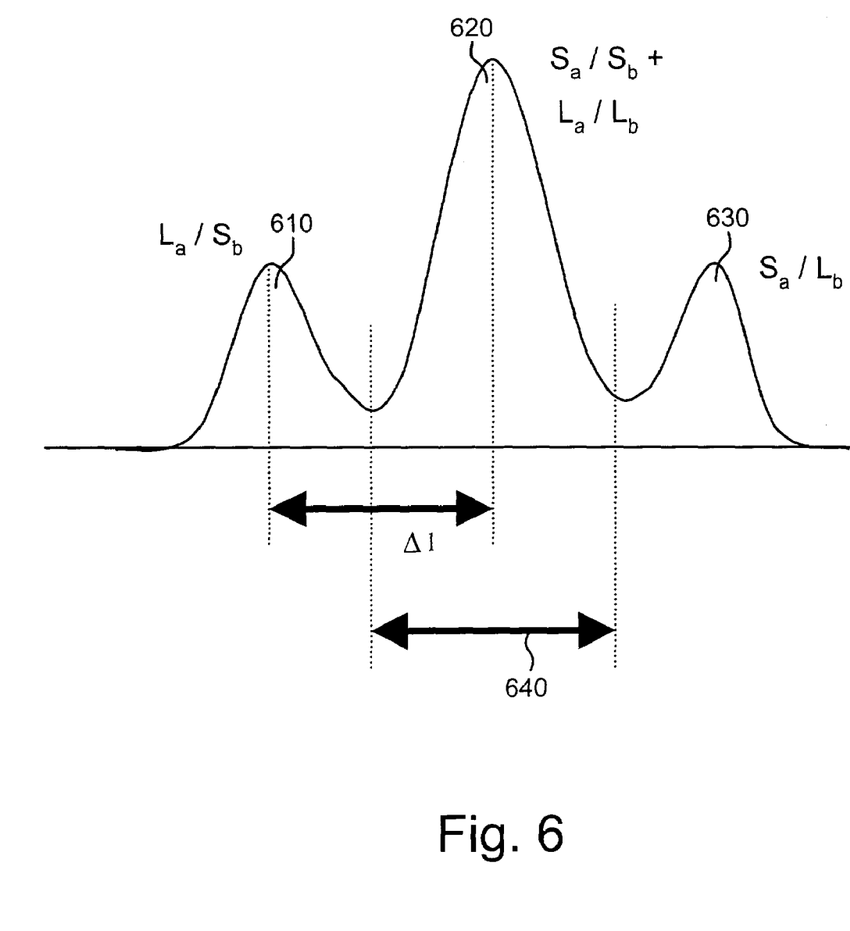
FIG. 6 illustrates a probability density function for the time of arrival of an entangled photon at the receiver of a cryptography system.

FIG. 6 illustrates a probability density function for the time of arrival of an entangled photon at detectors 180 in receiver 160. By way of overview, coincidences in transmitter 110 and receiver 160 may occur when an entangled photon passes through short arm 420 of transmitter 110 and its twin passes through short arm 440 of receiver 160, or when the entangled photon passes through long arm 410 of transmitter 110 and its twin likewise passes through long arm 430 of receiver 160. Peak 620 represents the joint probability of a coincidence. Period 640 represents a gating window for detectors 180 around peak 620, as will be explained in more detail below. The other two possibilities (i.e., long arm 410 of transmitter 110 mismatched with short arm 440 of receiver 160, or short arm 420 of transmitter 110 mismatched with long arm 430 of receiver 160) do not give coincidences. Peaks 610 and 630 represent the respective probabilities of the two non-coincidence cases.

By proper production of a herald signal in transmitter 110, receiver 160 may disambiguate these different coincidence and non-coincidence events. In system 100, herald source 140 in transmitter 110 may send a herald signal immediately after receiving a click on one of the detectors 130, and delay element 145 may delay the twin entangled photon by a fixed length of fiber delay line so that it arrives at receiver 160 after the herald signal. This delay gives receiver 160 a chance to gate detectors 180 to receive the corresponding entangled photon twin.

Suppose that transmitter 10's photon followed short arm 420, and transmitter 110 sends the herald signal upon detection of the "short arm" photon. Receiver 160 may enable (i.e., "gate") its detectors 180 at an appropriate time after receiving the herald signal. If the second entangled photon also follows receiver 160's short arm 440, its arrival will fall within the detector gating window 640. If the second entangled photon takes receiver 160's long arm 430 instead, it will arrive too late (i.e., peak 630) for the gating window 640 and hence will not be detected. A similar process holds for those detections by detectors 130 caused by entangled photons that take transmitter 110's long arm 410. Those second entangled photons that take receiver 160's long arm 430 will be detected during gating period 640, but those that take receiver 160's short arm 440 will arrive too early (i.e., peak 610) for the gating window 640 and hence will not be detected. Thus, receiver 160 may gate detectors 360/370 so that they will only detect events in which both photons of the entangled pair took the short arms, or took the long arms, of modulators 125/175 and ignore the "mismatch" cases that do not give rise to coincidences.

It should be noted that the time difference among peaks 610–630 is governed directly by the difference in lengths $\Delta l$ between the long and short arms of the modulators 125/175, as illustrated in FIG. 6. Long arms 410/430 may be made a little longer to push the peaks farther apart by increasing $\Delta l$. The farther apart peaks 610–630 are, the less stringent are the requirements on jitter for detectors 360/370, jitter in emitting the herald signal, timing electronics, and so forth. As shown in FIG. 6 and as reflected in the inequality $l_c < \Delta l < l_p$, these timing constraints are not particularly severe, because the upper bound on $\Delta l$ is the coherence length $l_p$ of the pump photons. Coherence length $l_p$ may be on the order of 60 meters which corresponds to about 200 nanoseconds.

Finally, it should be noted that cryptography using the BB84 protocol in system 100 may be based only on coincidence events between entangled pairs of photons. Because only half of the potential joint detection events at transmitter 110 and receiver 160 are coincidences, this means that we only half of the potential detection events may be used for transmitting cryptographic data (i.e., the "values" of detectors 130/180). Also, because of the independent bases employed by transmitter 110 and receiver 160 in accordance with the BB84 protocol, only that subset of the coincidences in which transmitter 110 and receiver 160 agreed on the basis may be used. This reduces throughput of system 100 by another 50%. Other reductions in throughput of system 100 may be due to mis-detected photons or non-detected photons at transmitter 110 and/or receiver 160, photons being lost in channel 150, etc. Thus, the overall throughput of system 100 may be substantially less than the rate at which crystal 120 may produce pairs of entangled photons (e.g., about 20 to 100 KHz).

Exemplary Processing

Figure 7:
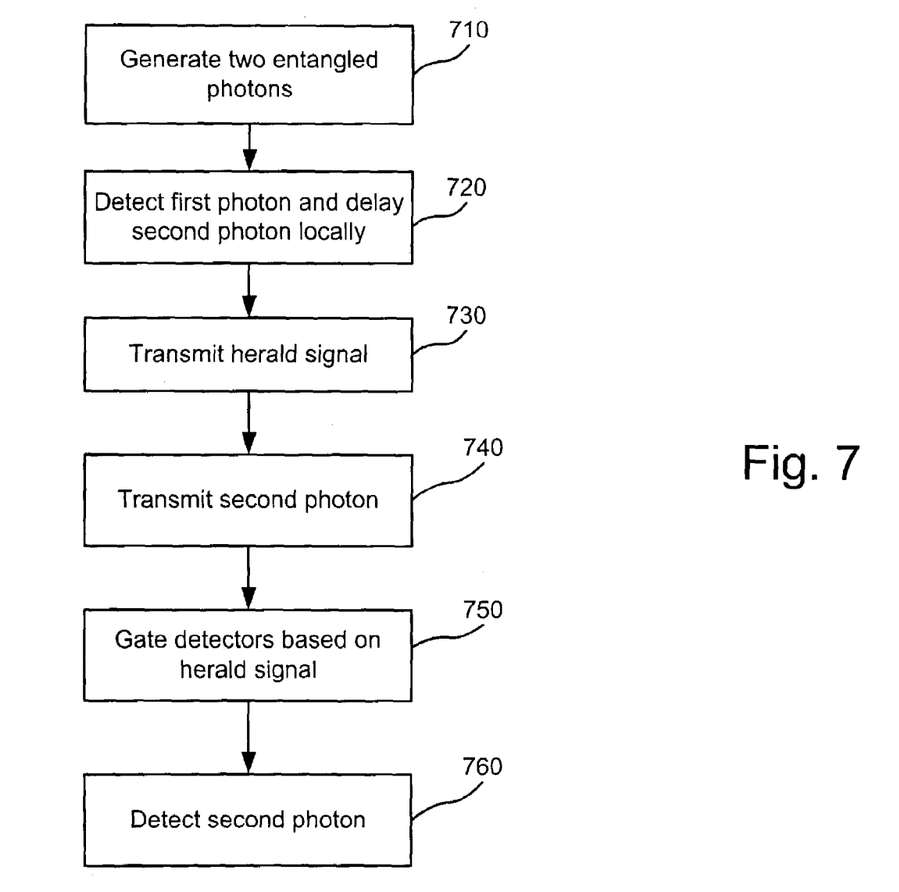
FIG. 7 illustrates an exemplary method of generating and transmitting information in accordance with implementations of the present invention.

FIG. 7 illustrates an exemplary method of generating and transmitting information in accordance with implementations of the present invention. Processing may begin with the generation of a pair of entangled photons by source 115 and crystal 120 [act 710]. Processing may continue by locally (i.e., in transmitter 110) detecting a first one of the photons with detectors 130 [act 720]. Prior to detection, the first photon may be phase-modulated by modulator 125. In some implementations, modulator 125 introduces a random phase shift to the first photon based on an externally-supplied basis value in accordance with a quantum encryption protocol, such as BB84. Meanwhile, the second entangled photon may be delayed by delay element 145.

Upon local detection of the first entangled photon, logic 135 may control herald source 140 to transmit a herald signal to receiver 160 via channel 150 [act 730]. At some point after transmission of the herald signal, the second entangled photon may exit delay element 145 and also may be transmitted to receiver 160 via channel 150 [act 740].

Herald detector 165 in receiver 160 may receive the herald signal, and logic 170 may gate detectors 180 based on the herald signal [act 750]. For example, detectors 180 may be biased beginning and ending at certain times so that detectors 180 will only detect the second photon if the two entangled photons took identical paths (i.e., short arm/short arm or long arm/long arm) in modulators 125 and 170. Because of this gating, path mismatches between the two entangled photons will not result in a detection of the second photon as described above with respect to FIG. 6.

If the path taken by the second entangled photon through modulator 175 coincides with the path taken by the first entangled photon through modulator 125, one of gated detectors 180 may detect the second photon [act 760]. In some implementations, modulator 175 introduces a random phase shift to the second photon based on an externally-supplied basis value in accordance with a quantum encryption protocol, such as BB84. After the detection, logic 170 may output the values from detectors 180 (i.e., D0 and D1 values) and the basis value that correspond to these values.

Other processing in accordance with the quantum encryption protocol used (e.g., BB84) may be performed by logic 170 or a processor external to receiver 160, as will be understood by those skilled in the quantum encryption art.

CONCLUSION

Systems and methods consistent with the present invention may locally detect one photon of an entangled photon pair. Another photon of the entangled photon pair may be remotely detected based on the local detection of the one photon.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although modulators 125/175 have been described, other devices may be used that operate to introduce and remove a suitable delay (e.g., Δl) between two signals. Similarly, phase shifters 230/330 may be replaced by any other device or component that produces an adjustable phase shift between two transmitted signals. Further, basis values employed by transmitter 110 and receiver 160 need not be externally-supplied.

Moreover, although certain exemplary wavelength values are described herein, the principles of the invention are not limited to these wavelength values. Rather, implementations consistent with the principles of the invention may utilize any other suitable wavelengths of electromagnetic radiation. For example, such suitable wavelengths may range from ultraviolet to visible to infrared wavelength regions, and may even include wavelengths above and/or below these wavelength regions.

Also, while a series of acts has been described with regard to FIG. 7, the order of the acts can be varied in other implementations consistent with the present invention, and non-dependent acts can be implemented in parallel.

No element, act, or instruction used in the description of the present invention should be construed as critical or essential to the invention unless explicitly described as such. As used herein, the article "a" is intended to include one or more items. Where only one item is intended, the term "one" or similar language is used. The scope of the invention is not limited to the foregoing description, and is instead defined by the appended claims and their equivalents.

What is claimed is:

1. A quantum cryptography system, comprising:
    a transmitter configured to generate entangled first and second photons, modulate and detect the first photon, and transmit detection information and the second photon, wherein the transmitter includes:
        an optical apparatus configured to produce the first and second entangled photons,
        a first modulator coupled to the optical apparatus and configured to modulate the first photon,
        detectors coupled to the first modulator and configured to detect the first photon, and
        a herald source configured to transmit the detection information to the receiver when the detectors detect the first photon, wherein the herald source is further configured to transmit one or more bits of control information including frame markers, sequence numbers, IP addresses, or training information; and
    a receiver configured to modulate the second photon and configured to detect the second photon based on the detection information.

2. The quantum cryptography system of claim 1, wherein the transmitter further includes:
    logic configured to change a phase shift applied to the first photon by the first modulator based on a basis value externally supplied to the transmitter.

3. The quantum cryptography system of claim 1, wherein the transmitter further includes:
    a delay element coupled to the optical apparatus and configured to delay the second photon before transmission to the receiver.

4. The quantum cryptography system of claim 1, wherein the receiver includes:
    a herald detector configured to detect the detection information.

5. The quantum cryptography system of claim 4, wherein the receiver further includes:
    a second modulator configured to modulate the second photon,
    detectors coupled to the second modulator and configured to detect the second photon, and
    logic coupled to the herald detector and configured to enable the detectors for a gating period based on the detection information.

6. The quantum cryptography system of claim 5, wherein the logic is configured to change a phase shift applied to the second photon by the second modulator based on a basis value.

7. The quantum cryptography system of claim 6, wherein the logic is configured to output values produced by the detectors and the basis value.

8. A transmitter in a quantum cryptography system, comprising:
    an optical apparatus configured to produce first and second entangled photons;
    a modulator configured to receive and modulate the first photon;
    two detectors coupled to an output of the modulator and configured to detect the first photon from the modulator;
    logic coupled to the modulator and the two detectors,
        wherein the first and second entangled photons produced by the optical apparatus have an associated coherence length, and
        wherein the modulator includes two arms with a path difference therebetween, the path difference of the modulator being greater than the coherence length of the first and second entangled photons,
        wherein the logic is configured to:
            receive an external basis value and supply the basis value to the modulator to selectively change a phase of the first photon, and
            receive outputs of the detectors and provide a trigger signal when one of the outputs indicates a detection of the first photon; and
    a herald source configured to transmit a herald signal via a communication channel upon receiving the trigger signal from the logic.

9. The transmitter of claim 8, wherein the optical apparatus includes:
    an optical source configured to produce pump photons having an associated coherence length, and
    a crystal configured to receive the pump photons and emit the first and second entangled photons.

10. The transmitter of claim 9, wherein the coherence length of the pump photons is greater than the path difference of the modulator.

11. The transmitter of claim 8, wherein the modulator includes:
    a phase shifter configured to impart a phase shift to the first photon based on the basis value from the logic.

12. The transmitter of claim 8, further comprising:
    a delay element configured to receive and delay the second photon by a predetermined amount before transmitting the second photon via a communication channel.

13. The transmitter of claim 8, wherein the first and second photons have different wavelengths.

* * * * *